(12) United States Patent
Christensen et al.

(10) Patent No.: US 7,193,001 B2
(45) Date of Patent: Mar. 20, 2007

(54) METHOD OF PRODUCING MASS COLORED BEER BOTTLES

(75) Inventors: Ian Christensen, Eltham (AU); Marie-Raphael Morvillier, Mulhouse (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 202 days.

(21) Appl. No.: 10/492,182

(22) PCT Filed: Oct. 4, 2002

(86) PCT No.: PCT/EP02/11167

§ 371 (c)(1),
(2), (4) Date: Apr. 9, 2004

(87) PCT Pub. No.: WO03/033584

PCT Pub. Date: Apr. 24, 2003

(65) Prior Publication Data

US 2004/0254271 A1    Dec. 16, 2004

(30) Foreign Application Priority Data

Oct. 12, 2001   (CH) .................................. 1884/01

(51) Int. Cl.
*C08K 5/315*   (2006.01)
(52) U.S. Cl. ............................ 524/209; 524/106; 8/512
(58) Field of Classification Search .................. 524/88, 524/106, 209; 8/512
See application file for complete search history.

(56) References Cited

U.S. PATENT DOCUMENTS

| | | | |
|---|---|---|---|
| 3,927,063 A * | 12/1975 | Peter et al. .................. | 558/403 |
| 4,006,178 A * | 2/1977 | Stagi et al. .................. | 558/370 |
| 4,322,487 A * | 3/1982 | Merrill et al. ................. | 430/37 |
| 5,131,916 A * | 7/1992 | Eichenauer et al. ........... | 8/527 |
| 5,324,348 A * | 6/1994 | Perret, Jr. ................. | 106/31.06 |
| 5,550,192 A | 8/1996 | Sheth et al. ................. | 525/194 |
| 5,858,628 A * | 1/1999 | Yoshida et al. ............. | 430/338 |
| 6,262,153 B1 * | 7/2001 | Webster et al. ............... | 524/99 |
| 6,716,898 B2 * | 4/2004 | Weaver et al. ................ | 524/88 |

FOREIGN PATENT DOCUMENTS

| | | |
|---|---|---|
| EP | 0 803 772 | 10/1997 |
| EP | 0 829 376 | 3/1998 |
| JP | 06200200 | * 7/1994 |

* cited by examiner

*Primary Examiner*—Lorna M. Douyon
*Assistant Examiner*—Amina Khan
(74) *Attorney, Agent, or Firm*—Joseph C. Suhadolnik

(57) ABSTRACT

A method of producing mass colored beer bottles comprising dyeing mass colored polyester with a dye of formula (1)

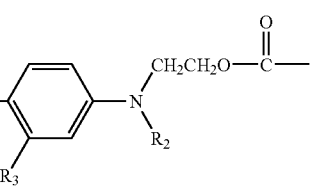

(1)

wherein
$R_1$ is a radical of formula

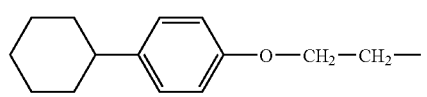

(2)

or of formula

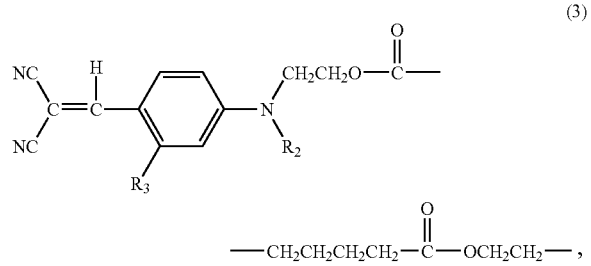

(3)

wherein
$R_2$ is hydrogen or $C_1$–$C_4$ and $R_3$ is hydrogen or $C_1$–$C_4$alkyl,
and a UV absorber.

7 Claims, No Drawings

METHOD OF PRODUCING MASS COLORED BEER BOTTLES

The present invention relates to a method of producing coloured plastics or coloured polymeric particles.

Dyes and the use thereof for colouring plastics and polymeric particles are known. The use of the known dyes on their own for colouring plastics in the mass has not, however, always fully met the increased demands, especially in terms of light fastness properties. There is accordingly a need for new colouring methods for the production of colourations in the mass that have a high tinctorial strength and, especially, light fastness and high temperature light fastness, and that exhibit good all-round fastness properties.

It has now, surprisingly, been found that the method according to the invention substantially meets the above criteria.

The present invention accordingly relates to a method of producing coloured plastics or coloured polymeric particles that comprises using a dye of formula

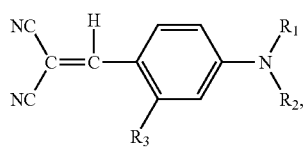
(1)

wherein

R₁ is a radical of formula

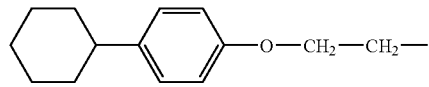
(2)

or of formula wherein $R_2$ is hydrogen or $C_1$–$C_4$alkyl, and
$R_3$ is hydrogen or $C_1$–$C_4$alkyl,
and/or a dye of formula

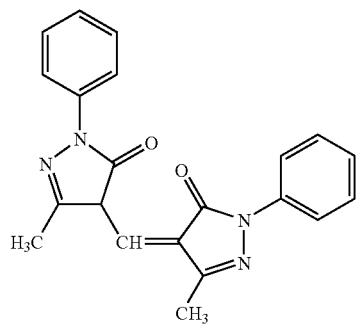
(4)

and a UV absorber.

$R_2$ and $R_3$ as $C_1$–$C_4$alkyl are each independently of the other methyl, ethyl, propyl, isopropyl, n-butyl, isobutyl, sec-butyl or tert-butyl.

$R_2$ is preferably ethyl.

$R_3$ is preferably methyl.

For the method according to the invention, preference is given to the dyes of formulae (4),

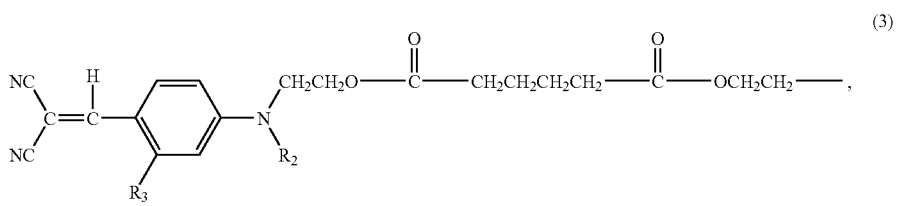
(3)

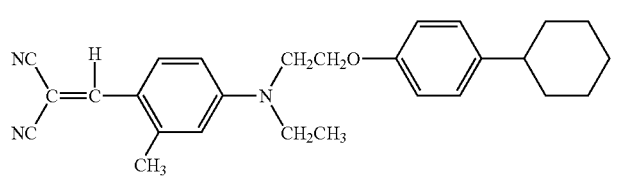

(5)

and

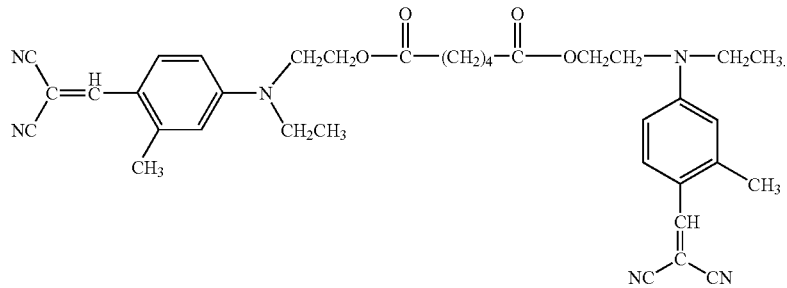

(6)

The amounts in which the dyes are admixed with the plastics or polymeric particles to be coloured can vary within wide limits depending on the desired depth of shade; generally, amounts of from 0.001 to 5% by weight, especially from 0.01 to 2% by weight, more especially from 0.03 to 0.5% by weight, based on the material to be coloured, have proved advantageous.

UV absorbers suitable for the method according to the invention include especially 2-(2'-hydroxyphenyl)benzotriazoles, 2-hydroxybenzophenones, esters of substituted or unsubstituted benzoic acid, acrylates, oxamides, 2-(2-hydroxyphenyl)-1,3,5-triazines, monobenzoates of resorcinol and formamidines, and also a polyester UV absorber of formula

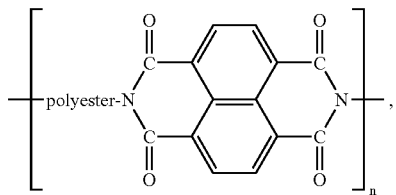

(7)

having a specific weight of from 1200 to 1400, preferably from 1300 to 1350, at 25° C.

From the class of the 2-(2'-hydroxyphenyl)benzotriazoles the following, for example, may be mentioned: 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α, α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazol-2-ylphenol]; the product of the esterification of 2-[3'-tert-butyl-5'-(2-methoxycarbonylethyl)-2'-hydroxyphenyl]-2H-benzotriazole with polyethylene glycol 300;

$[R-CH_2CH_2-COO-CH_2CH_2\!\!-\!\!]_2$, wherein R=3'-tert-butyl-4'-hydroxy-5'-2H-benzotriazol-2-ylphenyl, 2-[2'-hydroxy-3'(α,α-dimethylbenzyl)-5'-(1,1,3,3-tetramethylbutyl)phenyl]benzotriazole; and 2-[2'-hydroxy-3'-(1,1,3,3-tetramethylbutyl)-5'-(α,α-dimethylbenzyl) phenyl]benzotriazole.

From the class of the 2-hydroxybenzophenones the following, for example, may be mentioned: 4-hydroxy-, 4-methoxy-, 4-octyloxy-, 4-decyloxy-, 4-dodecyloxy-, 4-benzyloxy-, 4,2',4'-tri-hydroxy- and 2'-hydroxy-4,4'-dimethoxy derivatives.

From the class of the 2-(2-hydroxyphenyl)-1,3,5-triazines the following, for example, may be mentioned: 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2, 4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl)-4,6-diphenyl-1,3,5-triazine, 2-(2-hydroxy-4-methoxyphenyl)-4.6-diphenyl-1,3,5-triazine, 2,4,6-tris[2- hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

From the class of the oxamides the following, for example, may be mentioned: 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethyloxanilide and a mixture thereof with 2-ethoxy-2'-ethyl-5,4'-di-tert-butoxanilide, mixtures of o- and p-methoxy-disubstituted oxanilides and mixtures of o- and p-ethoxy-disubstituted oxanilides.

As esters of substituted or unsubstituted benzoic acid the following, for example, may be mentioned: 4-tert-butyl-phenyl salicylate, phenyl salicylates, octylphenyl salicylates, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate and 2-methyl-4,6-di-tert-butylphenyl 3,5-di-tert-butyl-4-hydroxybenzoate.

From the class of the acrylates the following, for example, may be mentioned: ethyl-α-cyano-β,β-diphenyl acrylate, isooctyl-α-cyano-β,β-diphenyl acrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N-(β-carbomethoxy-β-cyanovinyl)-2-methylindoline.

A monobenzoate resorcinol is, for example, a compound of formula

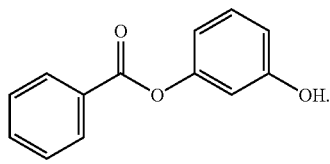

(8)

A formamidine is, for example, a compound of formula

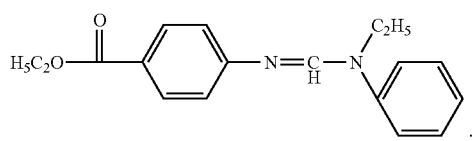

(9)

As UV absorbers it is also possible to use compositions comprising active methine compounds, for example unsubstituted or substituted malonate esters, as described, for example, in U.S. Pat. No. 6,207,740, WO-A-02/14418, EP-A-0 350 386, U.S. Pat. No. 4,661,566, U.S. Pat. No. 4,749,772 and EP-A-0 272 692.

The amount of UV absorber can vary within a wide range; advantageously from 0.01 to 1.0% by weight, especially from 0.02 to 0.6% by weight, and more especially from 0.05 to 0.4% by weight, of a UV absorber based on the weight of the plastics or polymeric particles is used.

The compounds of formulae (1) to (9) are known and can be prepared in a manner known per se according to known methods.

The method according to the invention of producing coloured plastics or coloured polymeric particles is carried out, for example, by admixing with those substrates, using roll mills or mixing or grinding apparatuses, at least one dye of formula (1) and/or the dye of formula (4) and a UV absorber, the dye and the UV absorber being dissolved or finely distributed in the high molecular weight material. The dye and UV absorber can be added simultaneously or in succession, it being possible for the order in which they are added to be selected as desired.

The dyes of formulae (1) and (4) can be used either alone or, preferably, in combination with other dyes.

Preference is given to a combination of the dye of formula (4), the dye of formula

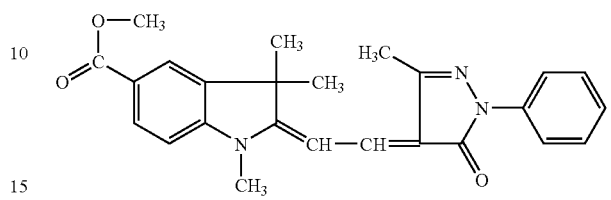

(10)

and the dye of formula

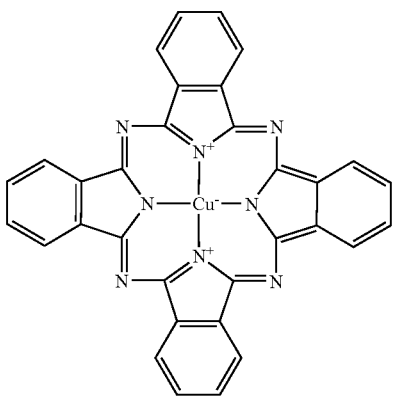

(11)

Preference is given likewise to a combination of the dye of formula (4), the dye of formula (5), the dye of formula (10) and the dye of formula (11).

Preference is given likewise to a combination of the dye of formula (4), the dye of formula (6), the dye of formula (10) and the dye of formula (11).

The high molecular weight organic material with the admixed dye and UV absorber is then processed according to methods known per se, such as, for example, calendering, compression moulding, extrusion, coating, spinning, pouring or injection moulding, as a result of which the coloured material acquires its final shape.

Admixture of the dye and the UV absorber can also be effected directly before the actual processing step, for example by continuously metering, directly Into the inlet zone of an extruder, a pulverulent dye, a pulverulent UV absorber and a granulated or pulverulent high molecular weight organic material and, optionally, also other ingredients, such as additives, the constituents being mixed in just before being processed. Generally, however, preference is given to mixing the dye and the UV absorber into the high molecular weight organic material prior to processing, since more uniformly coloured substrates can be obtained.

In order to produce non-rigid mouldings or to reduce brittleness, it is frequently desirable to incorporate so-called plasticisers into the high molecular weight compounds prior to shaping. There may be used as plasticisers, for example, esters of phosphoric acid, phthalic acid or sebacic acid. In the method according to the invention, the plasticisers can be incorporated into the polymers before or after the incorporation of the dye. It is also possible, in order to achieve different colour shades, to add to the high molecular weight organic materials, in addition to a dye of formula (1) and/or the dye of formula (4), also further dyes or also other colourants in any desired amounts, optionally together with further ingredients, e.g. fillers or siccatives.

Preference is given to the colouring of thermoplastic plastics, especially in the form of granules or mouldings, such as, for example, containers for solid or liquid substances, for example bottles, especially containers and bottles for drinks, especially beer. Preferred high molecular weight organic materials that can be coloured in accordance with the invention are generally polymers having a dielectric constant $\geq 2.5$, especially polyesters, polycarbonate (PC), polystyrene (PS), polymethyl methacrylate (PMMA), polyamide, polyethylene, polypropylene, styrene/acrylonitrile (SAN) and acrylonitrile/butadiene/styrene (ABS).

Especially preferred are polyesters and polyamide. More especially preferred are linear aromatic polyesters, which can be obtained by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBTP); also polycarbonates, e.g. those from $\alpha,\alpha$-dimethyl-4,4-dihydroxy-diphenyl-methane and phosgene, or polymers based on polyvinyl chloride and also on polyamide, for example polyamide 6 or polyamide 6.6.

Preferably, the dyes of formula (1) and (4) are used to colour beer bottles made of polyethylene terephthalate (PET).

The materials mentioned hereinabove, especially those of polyesters, that have been coloured using the method according to the invention are distinguished by level and tinctorially strong colour shades having very good in-use fastness properties, especially a good light fastness and high temperature light fastness.

The invention relates also to the use of a combination of a dye of formula (1) and/or the dye of formula (4) and a UV absorber for colouring plastics or polymeric particles.

The invention relates furthermore to the plastics coloured in the mass by the methods mentioned hereinabove.

The following Examples serve to illustrate the invention. Unless specified otherwise, the parts are parts by weight and the percentages are percentages by weight. The temperatures are given in degrees Celsius. The relationship between parts by weight and parts by volume is the same as between grams and cubic centimeters.

EXAMPLE 1

1200.00 g of polyester granules (PET Arnite D04-300, DSM) are predried for 4 hours at 130° C. and then homogeneously mixed in a roller rack mixing apparatus for 15 minutes, at 60 revs/min., with 0.50 g of the azo dye of formula (5) and 3.00 g of a UV absorber of formula

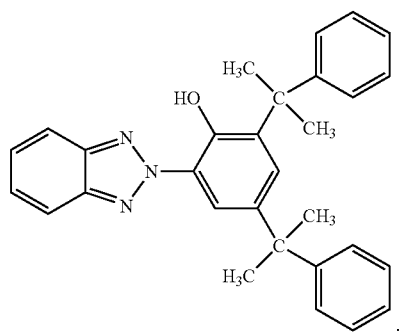

(12)

The homogeneous mixture Is extruded at a maximum temperature of 275° C. in an extruder (25 mm twin screw, Collin, D-85560 Ebersberg) having 6 heating zones, and is cooled with water, granulated in a Marke Sheer granulator and then dried for 4 hours at 130° C. in a drier (Turb Etuve TE 25, MAPAG AG, CH-3001 Bern).

Yellow-coloured polyester granules having good all-round fastness properties, especially very good light fastness and high temperature light fastness, are obtained.

EXAMPLE 2

1200.00 g of polyester granules (PET Arnite D04-300, DSM) are predried for 4 hours at 130° C. and then homogeneously mixed in a roller rack mixing apparatus for 15 minutes, at 60 revs/min., with 0.45 g of the dye of formula (6) and 0.28 g of the UV absorber of formula (12).

The homogeneous mixture is extruded at a maximum temperature of 275° C. in an extruder (25 mm twin screw, Collin, D-85560 Ebersberg) having 6 heating zones, and is cooled with water, granulated in a Marke Sheer granulator and then dried for 4 hours at 130° C. in a drier (Turb Etuve TE 25, MAPAG AG, CH-3001 Bern).

Yellow-coloured polyester granules having good all-round fastness properties, especially very good light fastness and high temperature light fastness, are obtained.

EXAMPLE 3

1200.00 g of polyester granules (PET Arnite D04-300, DSM) are predried for 4 hours at 130° C. and then homogeneously mixed in a roller rack mixing apparatus for 15 minutes, at 60 revs/min., with 0.30 g of the dye of formula (4) 0.24 g of the dye of formula (10), 0.30 g of the dye of formula (11) and 1.8 g of the UV absorber of formula (12).

The homogeneous mixture is extruded at a maximum temperature of 275° C. in an extruder (25 mm twin screw, Collin, D-85560 Ebersberg) having 6 heating zones, and is cooled with water, granulated in a Marke Sheer granulator and then dried for 4 hours at 130° C. in a drier (Turb Etuve TE 25, MAPAG AG, CH-3001 Bern).

Green-coloured polyester granules having good all-round fastness properties, especially very good light fastness and high temperature light fastness, are obtained.

What is claimed is:

1. A method of producing mass colored beer bottles which method comprises forming said beer bottles from mass colored polyester which method comprises incorporating into said polyester a dye of formula

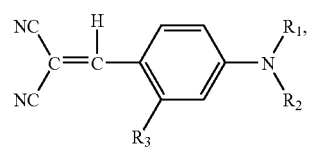

(1)

wherein
R$_1$ is a radical of formula

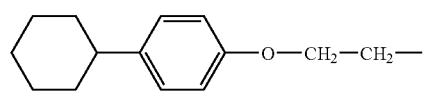

(2)

or of formula

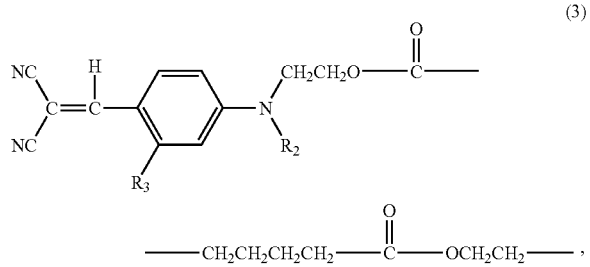

wherein
R₂ is hydrogen or $C_1$–$C_4$alkyl and R₃ is hydrogen or $C_1$–$C_4$alkyl,
and a UV absorber.

2. A method according to claim 1, which comprises incorporating, as dye of formula (1), the dye of formula

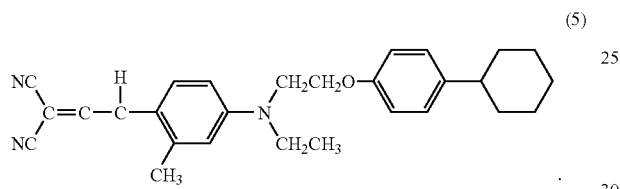

3. A method according to claim 1, which comprises incorporating, as dye of formula (1), the dye of formula

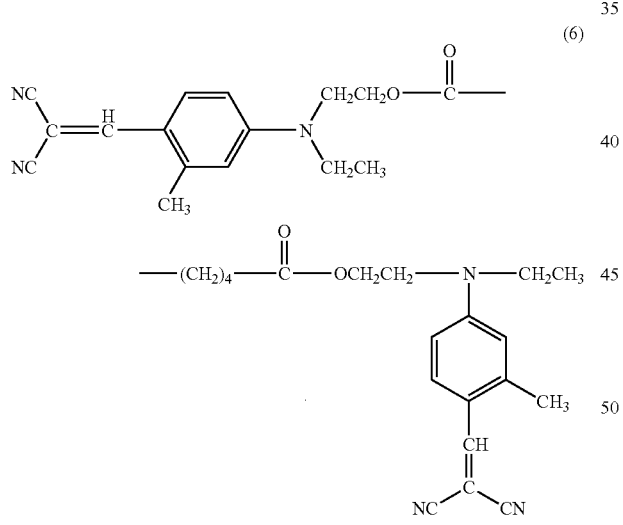

4. A method according to claim 1, which comprises using as UV-absorber a UV absorber from the class of the 2-(2'-hydroxyphenyl)benzotriazoles, of the 2-hydroxybenzophenones, of the esters of substituted or unsubstituted benzoic acid, of the acrylates, of the oxamides, of the 2-(2-hydroxyphenyl)-1,3,5-triazines, of the monobenzoates of resorcinol or of the formamidines, or a polyester UV absorber of formula

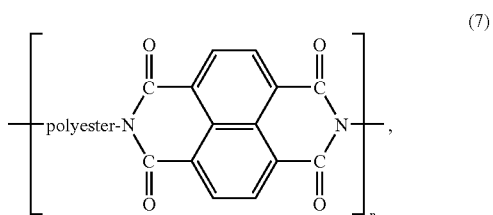

having a specific weight of from 1200 to 1400 at 25° C.

5. A method according to claim 1, wherein the polyester is polyethylene terephthalate.

6. The method of claim 1, further comprising a dye of formula

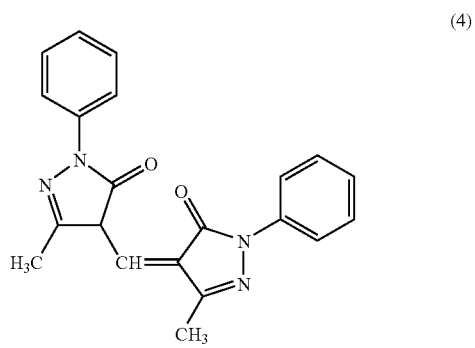

7. The method of claim 4, further comprising a dye of formula

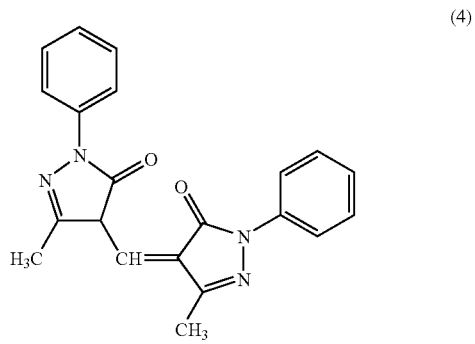

* * * * *